April 23, 1957 R. E. LAMBERTON 2,789,755
COMPRESSOR CONTROL SYSTEM
Filed Aug. 20, 1954 4 Sheets-Sheet 1

INVENTOR.
RALPH E. LAMBERTON
BY
ATTORNEYS

April 23, 1957 R. E. LAMBERTON 2,789,755
COMPRESSOR CONTROL SYSTEM
Filed Aug. 20, 1954 4 Sheets-Sheet 2
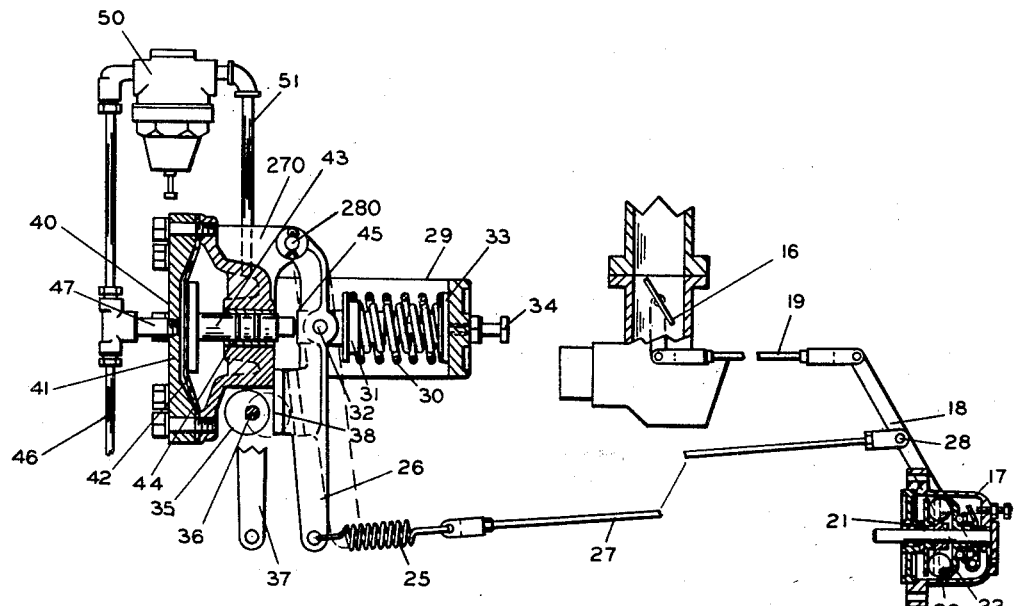
FIG. 2
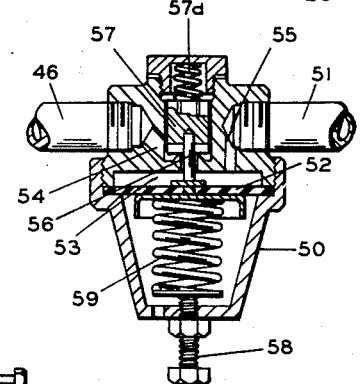
FIG. 4
FIG. 3
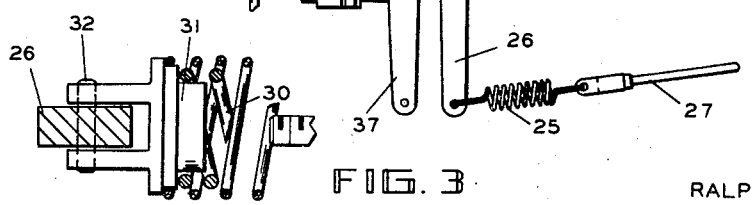
FIG. 5
INVENTOR.
RALPH E. LAMBERTON
BY
Corbett, Mahoney & Miller
ATTORNEYS

INVENTOR
RALPH E. LAMBERTON

United States Patent Office 2,789,755
Patented Apr. 23, 1957

2,789,755

COMPRESSOR CONTROL SYSTEM

Ralph E. Lamberton, Worthington, Ohio, assignor to The Jaeger Machine Company, Columbus, Ohio, a corporation of Ohio Application August 20, 1954, Serial No. 451,257

6 Claims. (Cl. 230—5)

My invention relates to a compressor control system. It relates, more specifically, to a compressor control apparatus or compressor regulator adaptable to a compressor which is driven by an internal combustion engine. The apparatus of this invention is designed to control and regulate the speed of operation of the driving engine in accordance with the output demand on the compressor.

The control or regulating system of this invention is described hereinafter and illustrated in the drawings as being applied to an air compressor of the portable type. However, it is to be understood that my apparatus can be applied to other types of compressors.

Compressors of the portable type comprise a compressor unit which is usually driven by an internal combustion engine. The engine may be a gasoline engine or a diesel engine. In the past, controls have been provided for compressors by which the driving engine thereof is controlled in such a manner that the engine operates at full speed and the compressor is loaded, whenever the air demand reduces the compressor discharge pressure below a predetermined minimum, and the engine operates at idle speed and the compressor is unloaded whenever the compressor discharge pressure rises to a predetermined maximum, due to the compressor pumping too much air. An intermediate speed type of compressor control has also been provided in the past which regulates the speed of the driving engine more in accordance with the demand on the compressor without actuating the unloading mechanism thereof until the predetermined maximum pressure is reached but this also is a step type of control, merely adding another step to the full speed and idle speed type of control. More recently, attempts have been made to provide more of a modulating type of control. If the engine is a gasoline engine, it has been proposed in the prior art to control the engine speed governor by altering the spring force to which the speed governor is subjected which will, in turn, control the throttle valve of the carburetor. In the case of a diesel engine, it has been proposed in the prior art to control the governor spring which will, in turn, control the fuel injection valve of the engine. However, this prior art type of compressor control is subject to constant fluctuation, is not independent of the loading and unloading mechanism of the compressor, and employs positive venting of air from the regulator which results in loss of considerable amounts of air pumped by the compressor.

According to my invention, I provide a modulating type of control wherein the control of the engine which drives the compressor also is effected by controlling the force exerted by the spring of the engine speed governor, whether the engine is a gasoline engine or a diesel engine, so that the governor will accordingly control the fuel supply valve of the engine and modulate the fuel supply to the engine. The control is effected by means of a pressure responsive regulator which is actuated by compressor discharge pressure. However, as distinguished from prior art compressor controls, my compressor control operates independently of the loading and unloading mechanism of the compressor, or in the case of a rotary compressor, independently of the means which closes off the air intake, to vary the speed of the engine in accordance with air demand and to thereby maintain a substantially constant compressor discharge pressure. The control of the engine speed by my regulator is a modulating control as distinguished from a stepped control. Furthermore, my regulator functions to provide a smooth increase or decrease of speed without the quick fluctuations of prior art devices. Also, the modulating control is effected by the pressure-responsive regulator without venting and, consequent loss of considerable amounts of air.

In the accompanying drawings I have illustrated several embodiments of my invention but it is to be understood that the invention can be embodied in other forms while not departing from the basic principles of my invention.

Figure 2 is a detail partly in side elevation and partly in section illustrating my compressor control.

Figure 3 is a side elevational view of the control.

Figure 4 is a sectional view through the pressure regulating valve of the control.

Figure 5 is a plan view of part of the control.

Figure 1:
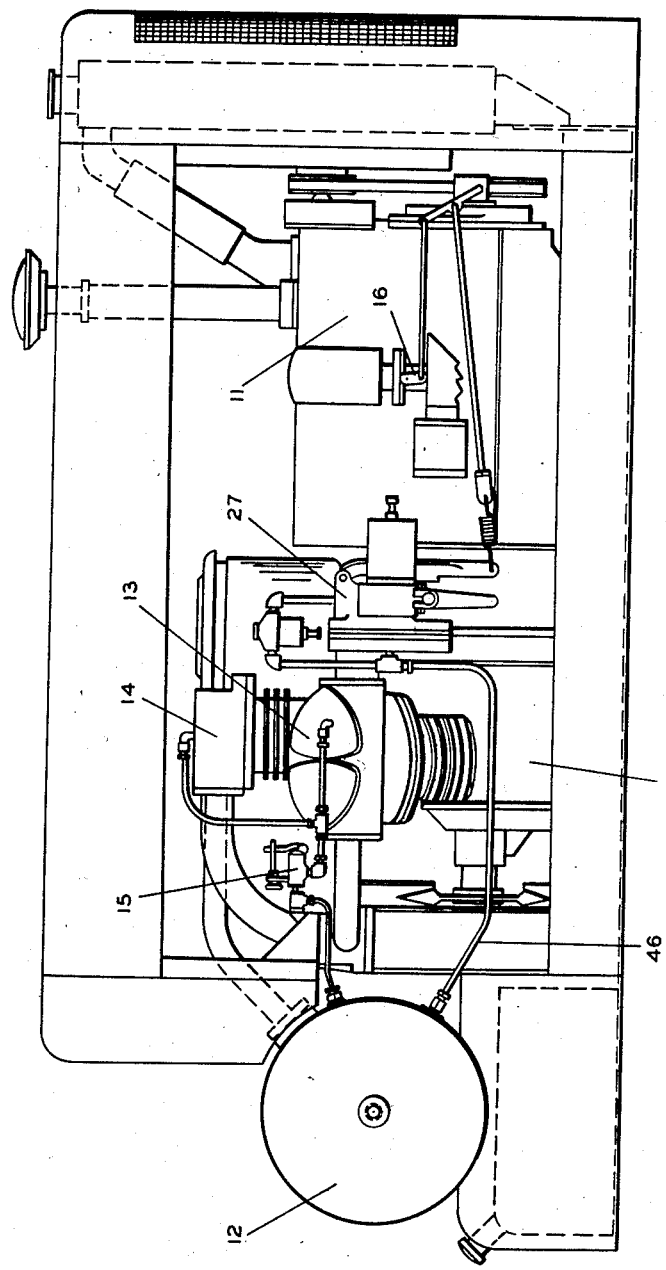
Figure 1 is a diagrammatic view illustrating my control applied to a compressor of the reciprocating piston type driven by a gasoline engine.

With reference to the drawings, in Figure 1 I have illustrated my invention applied to a compressor 10 which is driven by an engine 11.

The compressor 10 shown in this figure is of the reciprocating piston type. It is provided with an air receiver 12. The cylinders of the compressor are provided with loading and unloading valves indicated generally at 13 and 14 which are controlled in the usual manner by a pilot valve 15 connected thereto by suitable lines. The pilot valve 15 is connected to the receiver 12 by a suitable line so that it will be actuated by receiver pressure in the usual way.

The engine 11 is of the gasoline type and is provided with the usual throttle valve 16 for controlling the speed thereof. This throttle valve 16, as shown in Figure 2, is controlled by the engine speed governor 17 to which it is connected by the lever 18 and the linkage 19. The governor 17 may be of any suitable type but is shown as including the balls 20 which are mounted in a slotted guide disk 21 which is driven by the governor shaft that is rotatably driven by the engine. The balls 20 are moved outwardly by centrifugal force and cooperate with a cam collar 22 to swing the lever 18. Movement of the lever 18 by the balls 20 is resisted by a tension spring 25 which is anchored to the lower end of a lever 26. The spring 25 is connected to a link 27 and this link 27 is pivoted at 28 to the lever 18 intermediate its length. Movement of the lever 18 to the right (Figure 2) against the tension exerted by the spring 25 results in operation of the throttle valve 16 to decrease the speed of the engine 11.

According to my invention, the tension exerted by the spring 25 to resist movement of the lever 18 towards low-speed position is varied by the control mechanism, which I provide, in accordance with the compressor discharge pressure. This control mechanism is completely independent of the loading and unloading system of the compressor previously mentioned.

The lever 26 to which the spring 25 is anchored is part of my control mechanism. This lever has its upper end pivoted (Figure 2) to a supporting bracket 270 at the point 280, the bracket being suitably attached to the frame of the compressor as shown in Figure 1. Attached to this bracket 270 is a horizontally disposed U-shaped extension 29 and the lever 26 passes vertically through this extension. Within this extension 29 is a double compression spring unit 30 which slips over a shouldered spring retainer 31 at one end and bears against the shoulder thereof. This retainer at its outer end is bifurcated (Figure 5) and straddles the lever 26 intermediate its height, being pivoted thereto at 32. The opposite end of the double spring unit 30 bears against a boss 33 on the inner surface of the closed end of the bracket extension 29. A stop screw 34 is threaded into this end of the bracket extension 29 and within the spring unit. Obviously, the spring unit 30 will resist movement of the lever 26 to the right (Figure 2) and in fact will keep the governor spring 25 under a predetermined tension. Movement of the lever 26 to the right will be limited by its contact with the inner end of the screw 34, the position of which is adjustable. In other words, the spring unit 30 will tend to keep the throttle valve 16 in open or high speed position by increasing the tension on the spring 25. The setting of the screw 34 will determine the low or idle speed position of the lever 26. In starting or stopping the compressor, it is desirable to have the lever 26 in such a position as to permit idle speed operation of the driving engine 11. To move the lever 26 to such a position that the tension on the spring 25 will be at a minimum and the throttle valve 16 will be moved completely open to idle speed position by the governor 17, I provide the cam arrangement shown in Figures 2 and 3. This cam arrangement comprises a cam 35 keyed to a shaft 36 which is rotatably mounted in the bracket 270 and which can be rotated by means of a hand lever 37 also keyed to the shaft 36. This cam 35 will engage a flat surface 38 on the adjacent edge of the lever 26. When the cam 35 is rotated by hand lever 37, the lever 26 is moved to the right, as shown by the dotted lines in Figure 2, thereby reducing the tension on the spring 25 and allowing the throttle valve 16 to close to idle speed position.

I provide a fluid-actuated regulator 40, which acts on the pressure differential principle, for opposing the action of the spring unit 30 and for moving the lever 26 to the right (Figure 2) in accordance with increase in compressor discharge pressure. This movement of the lever 26 will be a gradual or modulating movement in accordance with any gradual increase in compressor discharge pressure.

This regulator 40 is in the form of a diaphragm housing 41 which has a diaphragm 42 clamped therein. Bearing against one side of the diaphragm 42 is the inner end of a plunger 43 which is mounted for axial movement in a sleeve 44 formed in the wall of the housing 41. The outer end of this plunger engages a flattened part 45 on the lever 26 opposite the pivot 32. The left-hand side of the diaphragm 42 is subjected to compressor discharge pressure and, in this instance, the pressure is the pressure in the receiver 12. A line 46 runs from the receiver 12 (Figure 1) and is provided with a branch 47 which connects to the left-hand side of the diaphragm housing 41. The line 46 also connects to a pressure regulating valve 50 and this pressure regulating valve 50 is connected by a branch line 51 to the opposite side of the diaphragm housing 41. Thus, receiver pressure from the receiver 12 is applied directly to the one side of the diaphragm 42 and through the pressure regulating valve 50 to the opposite side of the diaphragm.

The pressure regulating valve 50 is of such a type that it can be set to limit the pressure which can be applied to the right-hand side of the diaphragm to a preselected maximum. It comprises a housing having a diaphragm 52 clamped therein. Above this diaphragm 52 is a pressure chamber 53. The line 46 communicates with this chamber through a bore 54 and a plunger bore 56 and the line 51 communicates with the chamber through a bore 55. The plunger in the bore 56 has its lower end bearing against the upper side of the diaphragm 52 and loosely carries a piston 57 on its upper end which is slidably mounted in the upper end of the housing, and which is retained on the plunger by a spring 57a. This piston 57 normally is unseated from a valve seat around the upper end of the bore 56 but when the pressure in the chamber 53 reaches a predetermined level, the diaphragm 52 flexes downwardly and the spring 57a pushes the piston 57 downwardly, closing the bore 56. The amount of pressure required to close the bore 56 leading to the line 51 is determined by the setting of a screw 58, carried by the lower end of the regulating valve housing, which varies the resistance of a compression spring 59 mounted in the lower end of the housing and which resists the downward movement of the diaphragm. Thus, the pressure of fluid in the line 51 and at the right-hand side of the diaphragm 42 is limited to a preselected amount.

In the operation of my compressor control system, assuming that the compressor 11 has been loaded and the driving engine 12 is operating, the pressure regulating valve 50 is set to limit the pressure on the right-hand side of the diaphragm 42 (Figure 2) to a preselected maximum which is selected by adjustment of the screw 58. For example, the valve may be set for a maximum value of 90 p. s. i. Both sides of the diaphragm 42 will be subjected to receiver pressure from the receiver 12. As there are no valves or restrictions to the flow of receiver pressure to the left-hand side of the diaphragm, the pressure at that side of the diaphragm will always be of the same value as the pressure in the receiver 12. Air flowing from the receiver 12 to the right-hand side of the diaphragm 42 must pass through the pressure regulating valve 50. Since this is set for a value of 90 p. s. i., the pressure on each side of the diaphragm 42 at this time will be equalized. Therefore, as long as the pressure is below 90 p. s. i., no movement of the diaphragm will take place as the air pressure on both sides of the diaphragm will be the same and the spring unit 30 will hold the diaphragm 42 and the lever 26 at the left-hand or full speed positions. As the air pressure in the receiver 12 further increases above 90 p. s. i., the regulating valve 50 closes so that the right-hand side of the diaphragm will not be subjected to a pressure of more than 90 p. s. i. As the pressure at the left-hand side of the diaphragm 42 increases above 90 p. s. i., the diaphragm will be moved toward the right compressing the spring unit 30, and moving the lever 26 to the right, thereby decreasing the tension on the governor spring 25, allowing the centrifugal force of the governor 17 to move the governor lever 18 to the right, thus moving the butterfly throttle valve 16 through the linkage 19 towards closing or low-speed position. With further decreases in air demand on the compressor and a consequent increase in pressure in the receiver 12, the pressure actuated regulator 40 will continue to move the butterfly valve 16 towards closed or minimum speed position. If the pressure in receiver 12 still continues to increase, the pilot valve 15 will be actuated to operate the cylinder unloading valves 13 and 14 to unload the compressor. While the compressor is loaded, if there is an increase in air demand and a consequent decrease of pressure in the receiver 12, the diaphragm 42 will move to the left, thus permitting the spring unit 30 to move the lever 26 to the left, and thereby decreasing the tension on the governor spring 25 and allowing the governor 17 to open the throttle valve 16 to increase the speed of the engine 11. In starting or stopping the compressor and when setting the lever 37 to force the diaphragm 42 to the right, sufficient air will leak past the plunger 43 to permit such movement of the diaphragm.

Thus, it will be seen that with my compressor control system, there is a modulating control of the engine speed so that above the predetermined pressure for which the regulating valve 50 is set, the speed of the engine 11 and the air compressor 10 will be determined by the air demand or compressor discharge pressure, so that the engine and the compressor will be operated between minimum and maximum speeds according to the air demand on the compressor.

As previously indicated, the hand lever 37 can be used to operate the arm 35 to move the lever 26 to an idle-speed position for starting or stopping the compressor.

Figure 6:
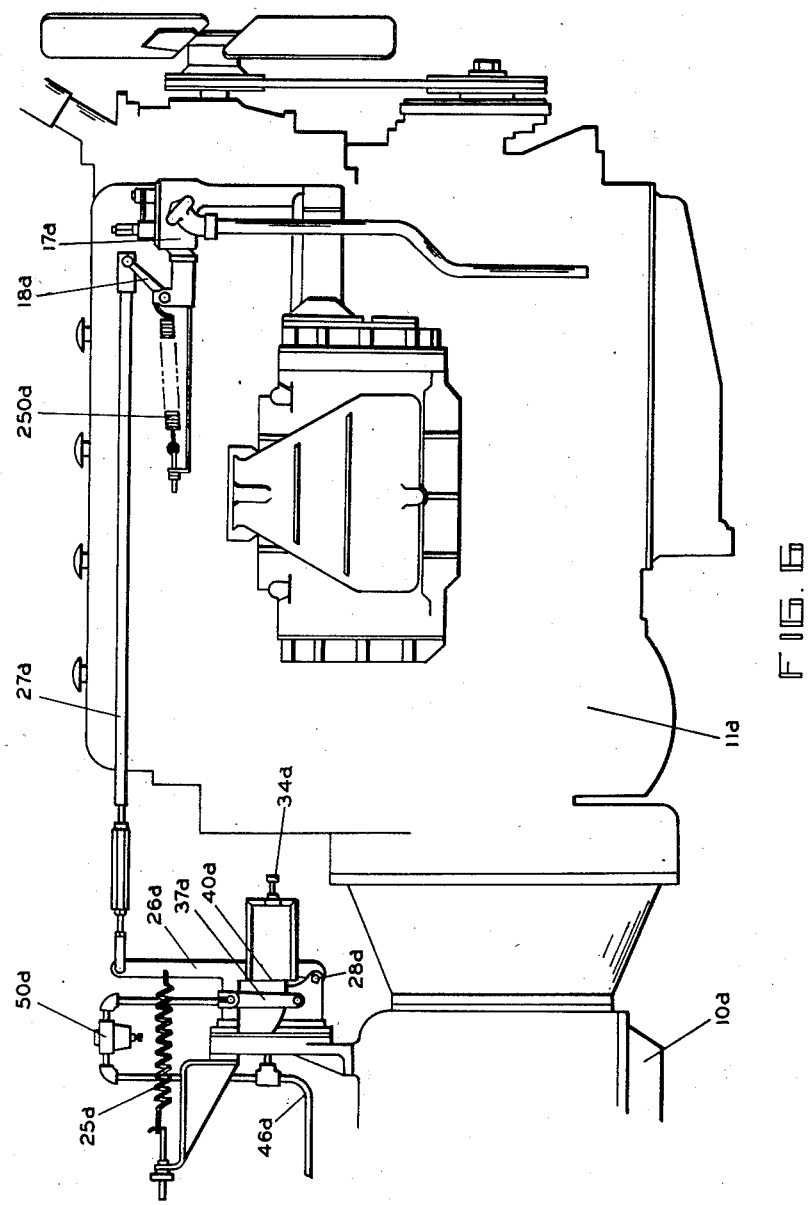
Figure 6 is a diagrammatic view showing the control applied to a compressor driven by a diesel engine.

In Figure 6, I have illustrated my invention applied to a compressor 10a driven by the engine 11a of the diesel type. The fluid-actuated regulator unit 40a is substantially as before being connected to the air receiver or other source of compressor discharge pressure by the line 46a, which also connects to the pressure regulating valve 50a. In this form, the lever 26a is pivoted at 28a at its lower end. The governor spring 25a is connected to the upper end of the lever and is anchored to a bracket attached to the compressor frame. The lever 26a is connected by the linkage 27a to the lever 18a of the governor 17a which may be of any suitable type and includes another spring unit 250a for resisting movement of the governor into position to close the fuel injection valve which it controls. The regulator 40a also includes the adjustable stop screw 34a which functions as before to determine the idle speed position of the lever 26a and the hand lever and cam mechanism 37a which can be actuated to set the lever 26a in idle speed position. This system will function practically identically with the system of Figure 2 to vary the resistance of governor springs 25a and 250a, and consequently, to close or open the fuel valve in accordance with compressor discharge pressure.

Figure 7:
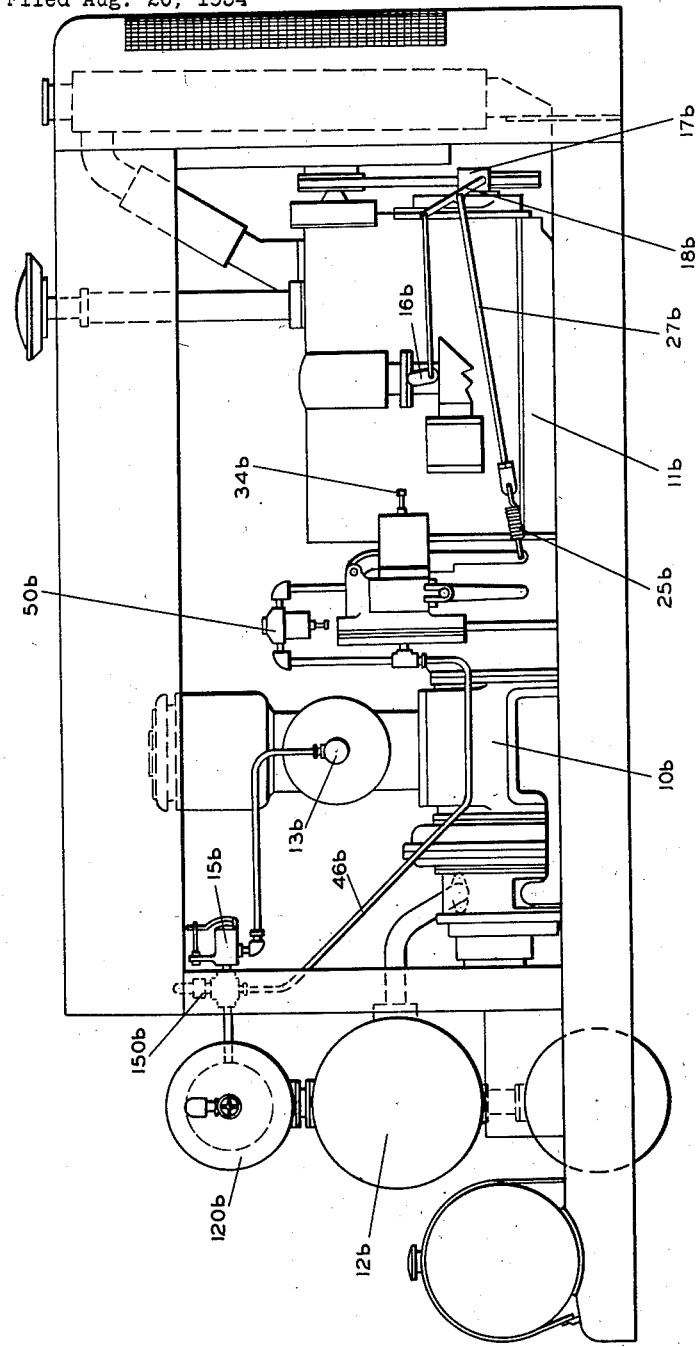
Figure 7 is a diagrammatic view similar to Figure 1 but showing the control applied to a rotary type compressor driven by a gasoline engine.

In Figure 7 I have illustrated my compressor control system applied to a compressor of the rotary type. In this instance, the engine 11b is shown as being of the gasoline type although it could be of the diesel type and be controlled as shown in Figure 6. The engine 11b drives the compressor 10b which is shown as being of the rotary type. It includes the air receiver tank 12b and the oil separator tank 120b in which the pressure will be substantially the same as in the receiver tank. The pressure-actuated regulator 50b is connected by the line 46b to the tank 120b. The tank 120b is also connected to a pilot valve 15b which controls the unloading mechanism 13b of the compressor which, in this rotary type of compressor, may embody means for shutting off the air intake of the compressor. Next to the valve 15b is a safety valve 150b set to release at a higher pressure than the maximum operating pressure of the compressor under normal conditions.

The remainder of the control mechanism is exactly as shown in Figure 1. The regulator 40b has the pressure regulating valve 50b, the adjustable stop screw 34b, the hand lever and cam arrangement 37b and the movable lever 26b. As before, the position of the lever 26b controls the tension of the governor spring 25b, which is connected to the link 27b, that connects to the governor lever 18b of the governor 17b, which controls the throttle valve 16b.

It will be apparent from the above description that I have provided a compressor control system which is of the modulating type that modulates the supply of fuel to the driving engine in accordance with the air demand on the compressor and its resulting effect on the compressor discharge pressure. My control operates on the pressure differential principle and operates independently of the loading and unloading mechanism of the compressor and without positive venting of any air.

Various other advantages will be apparent.

Having thus described my invention, what I claim is:

1. In combination with a fluid compressor having a driving engine and means for controlling the speed thereof comprising a governor for controlling the speed of the engine by regulating the fuel valve thereof to which it is connected, a control lever connected to said governor by linkage including a tension spring which resists movement of the governor away from full speed position towards idle speed position, a fluid-actuated pressure regulator connected to said control lever to control the movement thereof to change the tension of the governor spring in accordance with compressor discharge pressure, said pressure regulator embodying a housing having a diaphragm therein which divides the housing into two chambers, means for connecting one of said chambers directly to compressor discharge pressure which will act on one side of the diaphragm, a pressure regulating valve connected to the other of said chambers for subjecting the other side of said diaphragm to compressor discharge pressure up to a preselected maximum, said pressure regulating valve closing at said maximum to prevent further build-up of discharge pressure at that side of the diaphragm so as to create a pressure differential in said regulator, means for adjusting said pressure regulating valve to vary said maximum pressure, a plunger extending from the diaphragm through the last-named chamber and engaging one side of said control lever, a spring unit acting on the opposite side of said control lever to keep the control lever in high-speed position until its resistance is overcome by the creation of the differential pressure on the diaphragm at which time it is moved to low speed position, adjustable stop means positioned for contact by said control lever to limit its movement towards idle speed position, manual means for overcoming the resistance of said spring unit to permit the governor to move said valve into idle speed position, said manual means comprising a cam and lever arrangement which moves the control lever into idle speed position to thereby lessen the tension on said governor spring.

2. The combination of claim 1 in which the spring unit is a compression spring unit and the stop means comprises an adjustable screw extending into said spring unit.

3. The combination of claim 2 in which the compressor includes a fluid receiver and the pressure regulator is connected to the receiver.

4. The combination of claim 3 in which the compressor is of the rotary type and includes an oil separator tank, and the pressure regulator is connected to said tank.

5. In combination with a fluid compressor having a driving engine and means for controlling the speed thereof comprising a governor for controlling the speed of the engine by regulating the fuel valve thereof to which it is connected, a control lever connected to said governor by linkage including a tension spring which resists movement of the governor away from full speed position towards idle speed position, a fluid-actuated pressure regulator connected to said control lever to control the movement thereof to change the tension of the governor spring in accordance with compressor discharge pressure, said pressure regulator embodying a housing having a diaphragm therein which divides the housing into two chambers, means for connecting one of said chambers directly to compressor discharge pressure which will act on one side of the diaphragm, a pressure regulating valve connected to the other of said chambers for subjecting the other side of said diaphragm to compressor discharge pressure up to a preselected maximum, said pressure regulating valve closing at said maximum to prevent further build up of discharge pressure at that side of the diaphragm so as to create a pressure differential in said regulator, a plunger extending from the diaphragm through the last-named chamber and engaging one side of said control lever, and a spring unit acting on the opposite side of said control lever to keep the control lever in high-speed position until its resistance is overcome by the creation of the differential pressure on the diaphragm at which time it is moved to low speed position.

6. In combination with a fluid compressor having a driving engine and means for controlling the speed thereof comprising a governor for controlling the speed of the engine by regulating the fuel valve thereof to which it is connected, a control lever connected to said governor by means including a tension spring which resists movement of the governor away from full speed position towards idle speed position, a fluid-actuated pressure regulator connected to said control lever to control the movement thereof to vary the tension of the governor spring in accordance with compressor discharge pressure, said pressure regulator embodying a housing having a movable regulating member therein which divides the housing into two chambers, means for connecting one of said chambers directly to compressor discharge pressure which will act on one side of the movable regulating member, a pressure regulating valve connected to the other of said chambers for subjecting the other side of said movable regulating member to compressor discharge pressure up to a preselected maximum, said pressure regulating valve closing at said maximum to prevent further build-up of discharge pressure at that side of the movable regulating member so as to create a pressure differential in said regulator, means operatively connecting the movable regulating member to said control lever, and a spring unit acting on the control lever to keep the control lever in high-speed position until its resistance is overcome by the creation of the differential pressure on the movable regulating member at which time it is moved to low speed position.

References Cited in the file of this patent

UNITED STATES PATENTS

| | | |
|---|---|---|
| 592,633 | Keith | Oct. 26, 1897 |
| 603,425 | Cummings | May 4, 1898 |
| 2,171,285 | Baker | Aug. 29, 1939 |
| 2,378,802 | Stater | June 19, 1945 |
| 2,661,893 | Le Valley | Dec. 8, 1953 |

FOREIGN PATENTS

| | | |
|---|---|---|
| 633,742 | Great Britain | Dec. 19, 1949 |